US012756964B2

(12) United States Patent
Tagami et al.

(10) Patent No.: US 12,756,964 B2
(45) Date of Patent: Oct. 6, 2026

(54) REPRODUCTION SYSTEM, DISPLAY APPARATUS, AND REPRODUCTION APPARATUS

(71) Applicant: SONY GROUP CORPORATION, Tokyo (JP)

(72) Inventors: Takahisa Tagami, Kanagawa (JP); Masahiko Horiuchi, Kanagawa (JP); Hiroshi Masuda, Tokyo (JP); Yusuke Masuda, Tokyo (JP); Satoshi Hasegawa, Tokyo (JP); Natsuko Maeda, Kanagawa (JP); Takayuki Negishi, Saitama (JP); Naoki Saito, Chiba (JP)

(73) Assignee: Sony Group Corporation, Tokyo (JP)

( * ) Notice: Subject to any disclaimer, the term of this patent is extended or adjusted under 35 U.S.C. 154(b) by 252 days.

(21) Appl. No.: 18/263,910

(22) PCT Filed: Dec. 28, 2021

(86) PCT No.: PCT/JP2021/048922
§ 371 (c)(1),
(2) Date: Aug. 2, 2023

(87) PCT Pub. No.: WO2022/172641
PCT Pub. Date: Aug. 18, 2022

(65) Prior Publication Data

US 2024/0089643 A1 Mar. 14, 2024

(30) Foreign Application Priority Data

Feb. 9, 2021 (JP) ................................ 2021-019008

(51) Int. Cl.
*H04R 1/02* (2006.01)

(52) U.S. Cl.
CPC ......... *H04R 1/028* (2013.01); *H04R 2499/15* (2013.01)

(58) Field of Classification Search
CPC .. H04R 2499/15; H04R 1/028; H04S 2400/05
See application file for complete search history.

(56) References Cited

U.S. PATENT DOCUMENTS

2010/0067726 A1* 3/2010 Suzuki .................. G06F 1/1605 381/333
2011/0025927 A1 2/2011 Yana et al.
(Continued)

FOREIGN PATENT DOCUMENTS

JP S57-003498 1/1982
JP H05-300596 11/1993
(Continued)

OTHER PUBLICATIONS

International Search Report and Written Opinion prepared by the Japan Patent Office on Mar. 11, 2022, for International Application No. PCT/JP2021/048922, 2 pgs.

*Primary Examiner* — Jason R Kurr
(74) *Attorney, Agent, or Firm* — SHERIDAN ROSS P.C.

(57) ABSTRACT

This disclosure relates to a reproduction system, a display apparatus, and a reproduction apparatus for providing higher acoustic performance. There is provided a reproduction system including a display apparatus including a display section configured to display an image of content, and a first sound output section configured to output a sound of the content in a manner localizing a sound image on a screen of the display section, and a reproduction apparatus including a processing section configured to process an audio signal of the content, and a second sound output section configured to output the sound of the content, in which the first sound output section and the second sound output section output the sound simultaneously on the basis of an audio signal of
(Continued)

a center channel of the content. This disclosure may be applied to an AV system formed by a television receiver and audio equipment, for example.

20 Claims, 13 Drawing Sheets

(56) References Cited

U.S. PATENT DOCUMENTS

| | | | | |
|---|---|---|---|---|
| 2011/0238193 | A1 | 9/2011 | Yana et al. | |
| 2018/0109894 | A1* | 4/2018 | Chabanne | H04S 3/002 |
| 2019/0116395 | A1 | 4/2019 | Kerdranvat | |
| 2019/0208300 | A1* | 7/2019 | Lee | H04R 1/028 |
| 2021/0168430 | A1* | 6/2021 | Kim | H04N 21/4307 |

FOREIGN PATENT DOCUMENTS

| | | | |
|---|---|---|---|
| JP | 2004-247890 | | 9/2004 |
| JP | 2009260458 | A | 11/2009 |
| JP | 2010-147608 | | 7/2010 |
| JP | 2011-035552 | | 2/2011 |
| WO | WO-2009078176 | A1 | 6/2009 |
| WO | WO-2014184994 | A1 | 11/2014 |
| WO | WO-2020003730 | A1 | 1/2020 |
| WO | WO-2020144937 | A1 | 7/2020 |

* cited by examiner

REPRODUCTION SYSTEM, DISPLAY APPARATUS, AND REPRODUCTION APPARATUS

CROSS REFERENCE TO RELATED APPLICATIONS

This application is a national stage application under 35 U.S.C. 371 and claims the benefit of PCT Application No. PCT/JP2021/048922, having an international filing date of 28 Dec. 2021, which designated the United States, which PCT application claimed the benefit of Japanese Patent Application No. 2021-019008, filed 9 Feb. 2021, the entire disclosures of each of which are incorporated herein by reference.

TECHNICAL FIELD

The present disclosure relates to a reproduction system, a display apparatus, and a reproduction apparatus. More particularly, the disclosure relates to a reproduction system, a display apparatus, and a reproduction apparatus for providing higher acoustic performance.

BACKGROUND ART

AV (Audio Visual) systems are prevalent which permit viewing of content such as TV programs and films with more realistic sounds.

PTL 1 discloses a speaker apparatus that provides surround sound reproduction for a television receiver with no need to place a center speaker at a center of its AV system. PTL 2 discloses a multichannel sound reproduction apparatus that places a speaker dedicated to reproducing a high-range component of an audio signal away from the other speakers and approximately at a center of a display unit, so that the sound image of reproduced sounds is localized substantially at the center of the display unit in synchronization with images.

CITATION LIST

Patent Literature

PTL 1: Japanese Patent Laid-Open No. 2004-247890
PTL 2: Japanese Patent Laid-Open No. Hei 5-300596

SUMMARY

Technical Problem

The AV systems constituted by a television receiver and audio equipment are subject to acoustic constraints when localizing the sound image on a screen that displays images. The AV systems are thus required to provide higher acoustic performance.

The present disclosure has been made in view of the above circumstances and proposes providing higher acoustic performance.

Solution to Problem

According to one aspect of the present disclosure, there is provided a reproduction system including a display apparatus including a display section configured to display an image of content, and a first sound output section configured to output a sound of the content in a manner localizing a sound image on a screen of the display section, and a reproduction apparatus including a processing section configured to process an audio signal of the content, and a second sound output section configured to output the sound of the content, in which the first sound output section and the second sound output section output the sound simultaneously on the basis of an audio signal of a center channel of the content.

The above reproduction system according to one aspect of this disclosure thus includes a display apparatus and a reproduction apparatus. The display apparatus includes a display section configured to display an image of content, and a first sound output section configured to output a sound of the content in a manner localizing a sound image on a screen of the display section. The reproduction apparatus includes a processing section configured to process an audio signal of the content, and a second sound output section configured to output the sound of the content. The first sound output section and the second sound output section output the sound simultaneously on the basis of an audio signal of a center channel of the content.

According to another aspect of the present disclosure, there is provided a display apparatus including a display section configured to display an image of content, and a first sound output section configured to output a sound of the content in a manner localizing a sound image on a screen of the display section, in which, on the basis of an audio signal of a center channel of the content, the first sound output section outputs the sound corresponding to the audio signal of the center channel of the content simultaneously with a second sound output section included in a reproduction apparatus.

The above display apparatus according to another aspect of the present disclosure thus includes a display section configured to display an image of content, and a first sound output section configured to output a sound of the content in a manner localizing a sound image on a screen of the display section. On the basis of an audio signal of a center channel of the content, the first sound output section outputs the sound corresponding to the audio signal of the center channel of the content simultaneously with a second sound output section included in a reproduction apparatus.

According to a further aspect of the present disclosure, there is provided a reproduction apparatus including a processing section configured to process an audio signal of content, and a second sound output section configured to output a sound based on the audio signal of the content, in which, on the basis of an audio signal of a center channel of the content, the second sound output section outputs the sound corresponding to the audio signal of the center channel simultaneously with a first sound output section that outputs the sound of the content in a manner localizing a sound image on a screen of a display section included in a display apparatus.

The above reproduction apparatus according to a further aspect of this disclosure thus includes a second sound output section configured to output a sound based on the audio signal of the content. On the basis of an audio signal of a center channel of the content, the second sound output section outputs the sound corresponding to the audio signal of the center channel simultaneously with a first sound output section that outputs the sound of the content in a manner localizing a sound image on a screen of a display section included in a display apparatus.

Note that the above display apparatus and reproduction apparatus according to a further aspect of the present disclosure may each be either an independent apparatus or an internal block constituting part of a single apparatus.

DESCRIPTION OF EMBODIMENT

1. Embodiment of Present Disclosure

System Overview

Figure 1:
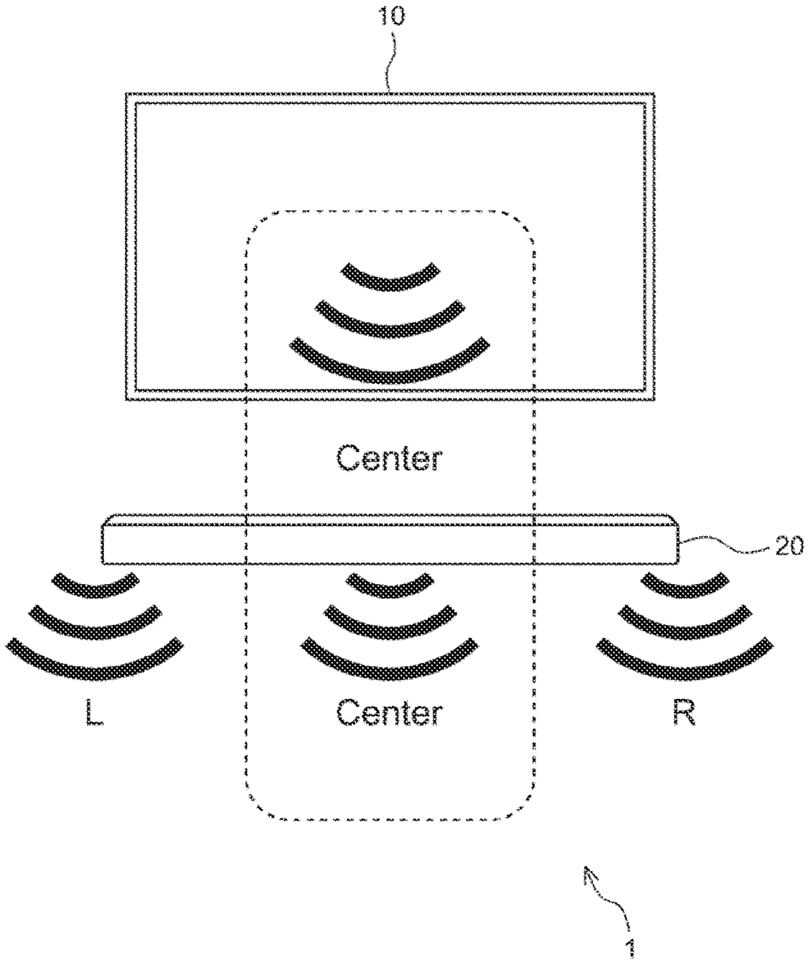
FIG. 1 is a view explaining an overview of a reproduction system to which the present disclosure is applied.

FIG. 1 is a view explaining an overview of a reproduction system to which the present disclosure is applied.

In FIG. 1, an AV system 1 is an example of a reproduction system that reproduces images and sounds of content. The AV system 1 is configured with a television receiver 10 and audio equipment 20. The television receiver 10 and the audio equipment 20 are interconnected by, for example, a cable that complies with appropriate standards.

The television receiver 10 reproduces and displays the images of content, and reproduces and outputs the sound of content. The audio equipment 20 includes multiple speakers such as front-channel and center-channel speakers, and, in coordination with the television receiver 10, reproduces and outputs the sound of the content.

Figure 2:
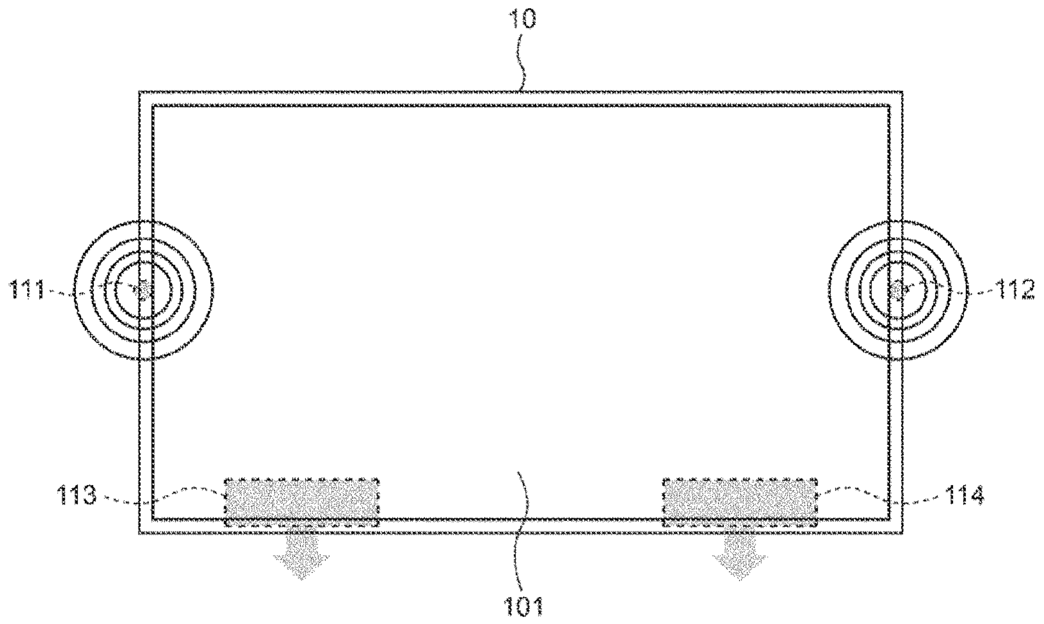
FIG. 2 is a view depicting a first example of sound reproduction by a television receiver.
Figure 3:
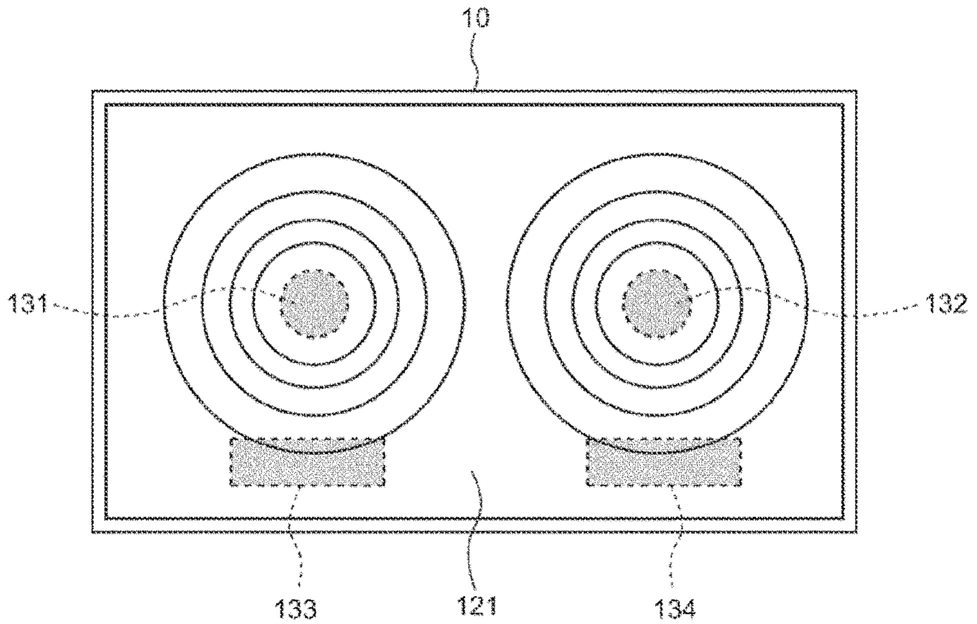
FIG. 3 is a view depicting a second example of sound reproduction by the television receiver.

The television receiver 10 synchronizes images and sounds of content in position so as to localize a sound image on a screen that displays the images. For the television receiver 10, the method of on-screen localization for localizing the sound image on the screen varies depending on the type of the display panel in use. FIGS. 2 and 3 depict examples of the on-screen localization method.

In FIG. 2, the television receiver 10 has a liquid-crystal display section 101. On the television receiver 10 in FIG. 2, a bezel portion around the screen of the liquid-crystal display section 101 is oscillated by actuators 111 and 112 to reproduce the sound of content in a manner localizing the sound image on the screen. With the television receiver 10 in FIG. 2, speakers 113 and 114 oriented downward at the bottom of the receiver back reproduce the sound of content.

In FIG. 3, the television receiver 10 has an organic EL (Electro Luminescence) display section 121. With the television receiver 10 in FIG. 3, the screen of the organic EL display section 121 is oscillated by actuators 131 and 132 arranged at the back to reproduce the sound of content in a manner localizing the sound image on the screen. With the television receiver 10 in FIG. 3, speakers 133 and 134 arranged at the bottom of the back reproduce the sound of content.

Returning to FIG. 1, the television receiver 10 reproduces and outputs the sound corresponding to an audio signal of a center channel of content (center sound) in a manner localizing the sound image on the screen that displays content images. In coordination with the television receiver 10, the audio equipment 20 reproduces and outputs the sound corresponding to the audio signal of the center channel of content (center sound) from the center-channel speaker.

In the AV system 1, as described above, the television receiver 10 and the audio equipment 20 operate in coordination with each other to simultaneously reproduce the sound corresponding to the audio signal of the center channel of content (center sound) so as to synchronize the images and the sounds of content in position.

Here, given content that involves images and sounds, their positions are synchronized in such a manner that the sound image is localized on the screen displaying the images. This allows a user to experience more realistic sensations of sounds synchronized with images.

In a common AV system, the center-channel speaker (center speaker) is arranged near the television receiver. However, with this center speaker positioned at the top or the bottom of the television receiver, images and sounds are not completely synchronized in position. For example, in a separate-type speaker AV system or in a sound bar speaker system, the center-channel speaker is arranged near the television receiver.

Specifically, in the separate-type speaker AV system, the center-channel speaker is arranged near the television receiver and multichannel speakers are arranged around the user. The sound bar accommodates multichannel speakers and an AV amplifier in a bar-like housing and is set up near the television receiver.

In recent years, a screen size of the television receiver has been rapidly increased. The larger the screen size, the more pronounced the problem of discrepancy in position between images and sounds. On the other hand, with the television receiver, it is often a case that speakers oriented downward for sound reproduction are arranged at the bottom of the back due to speaker layout constraints.

In order to synchronize images and sounds on the television receiver, a bezel portion around the screen is oscillated in a case where the liquid-crystal display section is used or the screen itself is oscillated in a case where the organic EL display section is employed for sound reproduction and sound image localization on the screen, as depicted in FIGS.

2 and 3. Such methods of on-screen localization, however, incur acoustically severe conditions in terms of speaker sound reproduction. Due to constraints on the ability to reproduce low-range sound, the acoustic performance such as frequency characteristics and distortion factor of the television receiver is worsened compared to the audio equipment.

In the AV system 1 in FIG. 1, by contrast, the television receiver 10 and the audio equipment 20 operate in coordination with each other (align the speaker-reproduced sounds) to simultaneously reproduce the sound corresponding to the audio signal of the center channel (center sound). This synchronizes the images and the sounds in position, thereby localizing the sound image on the screen. This in turn enables the AV system 1 to provide higher acoustic performance (e.g., in terms of frequency characteristics and distortion factor) than that of common AV systems.

Examples of System Configuration

Figure 4:
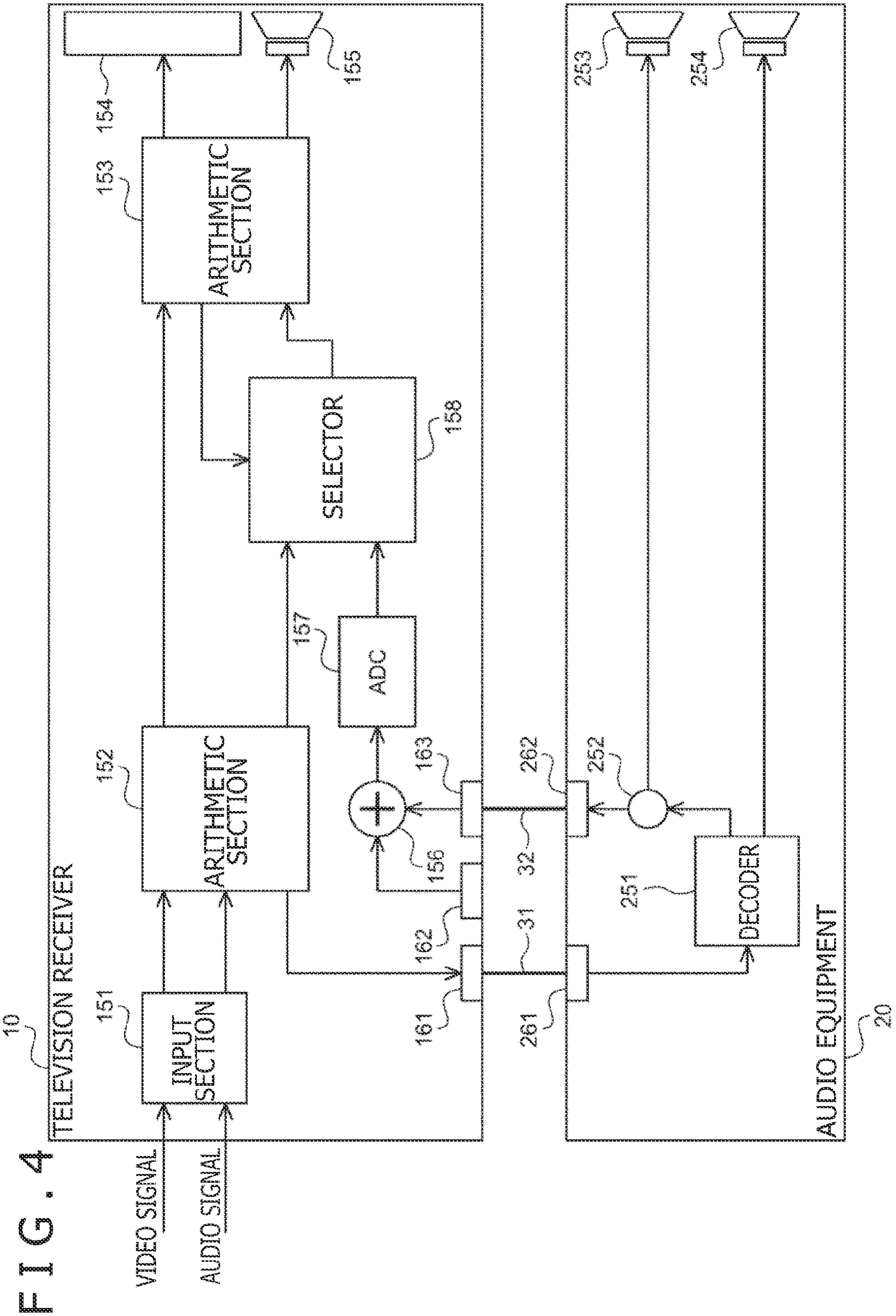
FIG. 4 is a block diagram depicting a first example of the configuration of the reproduction system to which the present disclosure is applied.

FIG. 4 is a block diagram depicting a first example of the configuration of the reproduction system to which the present disclosure is applied.

In FIG. 4, the television receiver 10 and the audio equipment 20 are interconnected by a transmission cable 31 and a center-speaker cable 32. The transmission cable 31 is a cable that complies with communication protocols such as HDMI (registered trademark)(High Definition Multimedia Interface). The center-speaker cable 32 is a cable that transmits the audio signal of the center channel.

The television receiver 10 includes terminals 161 through 163. The audio equipment 20 includes terminals 261 and 262. Between the television receiver 10 and the audio equipment 20, the transmission cable 31 connects the terminal 161 with the terminal 261, and the center-speaker cable 32 connects the terminal 163 with the terminal 262.

In FIG. 4, the television receiver 10 includes an input section 151, an arithmetic section 152, an arithmetic section 153, a display section 154, a sound output section 155, a synthesis section 156, an AD converter 157, and a selector 158.

The input section 151 receives input of video and audio signals of content and supplies the arithmetic section 152 with the input video and audio signals. The input section 151 is configured as a tuner, for example. In a case where the input section 151 is configured as the tuner, the input section 151 performs processes such as demodulation on broadcast signals received via an antenna (not depicted), and supplies the arithmetic section 152 with the video and audio signals resulting from the processing.

The broadcast signals propagate broadcast content (e.g., TV programs) transmitted according to predetermined broadcast methods such as terrestrial broadcast, satellite broadcast, and closed-circuit TV broadcast. Note that, instead of being configured as the tuner, the input section 151 may be configured as a communication module or a predetermined input interface, for example.

For example, in a case where the input section 151 is configured as the communication module, the input section 151 receives signals of communication content (such as videos) distributed by video delivery services (e.g., OTT (Over The Top) service) via a communication network such as the Internet. The input section 151 supplies the signals thus received to the arithmetic section 152.

In a case where the input section 151 is configured as an interface that complies with predetermined protocols such as the HDMI (registered trademark) or the USB (Universal Serial Bus), the input section 151 supplies the arithmetic section 152 with signals of content recorded by a video recorder (video player) or by network storage, signals of game content reproduced by a game machine, or signals of content recorded on recording media such as optical disks or semiconductor memories.

The arithmetic section 152 is configured as a processor such as an SoC (System on a Chip) or a CPU (Central Processing Unit). The arithmetic section 152 performs predetermined arithmetic processes on the basis of the signals input thereto.

The arithmetic section 152 performs processes such as decoding on the video signal of content supplied from the input section 151, and supplies the arithmetic section 153 with the video signal resulting from the processing. Further, the arithmetic section 152 outputs the audio signal of content fed from the input section 151, to the audio equipment 20 via the transmission cable 31.

The arithmetic section 153 is configured with an integrated circuit such as LSI (Large Scale Integration) or with a dedicated processor. The arithmetic section 153 performs predetermined arithmetic processes on the basis of the signals input thereto.

On the basis of the video signal supplied from the arithmetic section 152, the arithmetic section 153 displays the images of content on the display section 154. For example, the display section 154 is configured as a liquid-crystal display section 101 (FIG. 2) or as an organic EL display section 121 (FIG. 3).

Also, on the basis of the audio signal supplied from the selector 158, the arithmetic section 153 outputs (reproduces) the sound of content from the sound output section 155. The sound output section 155 is a speaker that reproduces and outputs the sound corresponding to the audio signal of content.

For example, in a case where the display section 154 is the liquid-crystal display section 101 (FIG. 2), the sound output section 155 is configured as the actuators 111 and 112 (FIG. 2) oscillating the bezel portion around the screen of the liquid-crystal display section 101. In a case where the display section 154 is the organic EL display section 121 (FIG. 3), the sound output section 155 is configured as the actuators 131 and 132 (FIG. 3) oscillating the screen of the organic EL display section 121 from the back side.

Under control of the arithmetic section 153, the selector 158 selects either the audio signal supplied from the arithmetic section 152 or the audio signal fed from the AD converter 157, and sends the selected audio signal to the arithmetic section 153. A downstream-side audio signal that may be selected is a center signal input from the audio equipment 20 via the center-speaker cable 32, the center signal having been converted from analog to digital format by the AD converter 157. The sound output section 155 reproduces and outputs the sound (center sound) corresponding to the center signal from the arithmetic section 153.

The center signal is the audio signal of the center channel. In the description that follows, the audio signal of the center channel will be referred to as the center signal, and the audio signal of the other channels excluding the center channel will be referred to as the other-channel signal. Note that the center signal supplied to the AD converter 157 may be synthesized (supplemented) with a predetermined signal as needed.

Note that the arithmetic section 152 may supply the arithmetic section 153 with speaker-related parameters of the television receiver 10 (e.g., setting information such as speaker mode). On the basis of the parameters from the arithmetic section 152, the arithmetic section 153 switches the audio signal to be selected by the selector 158. For example, in a case where the selector 158 selects an upstream-side audio signal (audio signal supplied from the arithmetic section 152) that may be selected, the arithmetic section 152 performs processes such as decoding on the audio signal fed from the input section 151, and supplies the selector 158 with the audio signal resulting from the processing.

In FIG. 4, the audio equipment 20 includes a decoder 251, a splitting section 252, a sound output section 253, and a sound output section 254.

The decoder 251 is supplied with the audio signal of content input from the television receiver 10 via the transmission cable 31. The decoder 251 decodes the audio signal of content input thereto, supplies the center signal resulting from the decoding to the splitting section 252, and feeds the other-channel signal to the sound output section 254.

By splitting the center signal supplied from the decoder 251, the splitting section 252 supplies the center signal to the sound output section 253 as well as to the television receiver 10 via the center-speaker cable 32.

The sound output section 253 is a center-channel speaker (center speaker) that reproduces and outputs the sound corresponding to the center signal. The sound output section 253 reproduces and outputs the sound (center sound) corresponding to the center signal supplied from the splitting section 252.

The sound output section 254 is other-channel speaker that reproduces and outputs the sound corresponding to the other-channel signal (a speaker for the other channels excluding the center channel). The sound output section 254 reproduces and outputs the sound corresponding to the other-channel signal supplied from the decoder 251 (other-channel sound).

Note that the arithmetic section 152 of the television receiver 10 gives notification of the speaker-related parameters of the television receiver 10 (e.g., setting information such as speaker mode) to the audio equipment 20 via the transmission cable 31. This allows the audio equipment 20 to recognize that the center signal for on-screen localization is to be output to the television receiver 10.

The television receiver 10 and the audio equipment 20 configured as discussed above align the speaker-reproduced sounds in a manner simultaneously reproducing the sound corresponding to the center signal (center sound). Images and reproduced sounds are thus synchronized in position, which localizes the sound image on the screen.

Note that, in FIG. 4, the television receiver 10 and the audio equipment 20 are configured to be interconnected via the transmission cable 31 and the center-speaker cable 32. However, this configuration is not limitative of how these pieces of equipment are to be interconnected. For example, the video and audio signals may be transmitted as digital signals using cables complying with communication protocols such as the HDMI (registered trademark). Alternatively, the video and audio signals may be transmitted by using analog signals or by use of both digital and analog signals.

As another alternative, wired communication using cables may be replaced with wireless communication for signal exchanges between the television receiver 10 and the audio equipment 20 based on predetermined communication protocols. As a further alternative, the transmission cable 31 and the center-speaker cable 32 may be integrated into a single cable for connection between the television receiver 10 and the audio equipment 20.

Second Example

Figure 5:
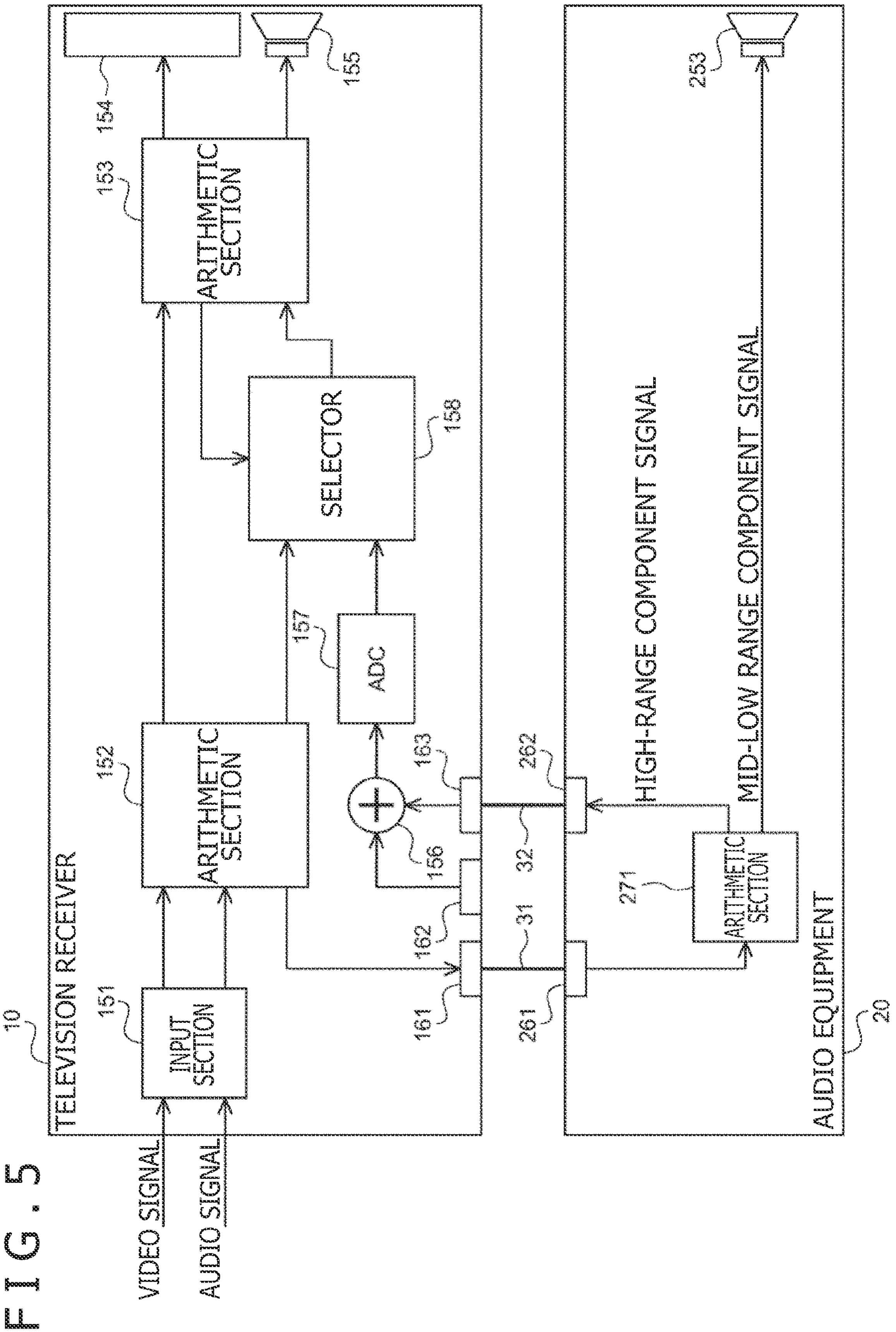
FIG. 5 is a block diagram depicting a second example of the configuration of the reproduction system to which the present disclosure is applied.

FIG. 5 is a block diagram depicting a second example of the configuration of the reproduction system to which the present disclosure is applied.

In the configuration depicted in FIG. 5, the constituent elements corresponding to those in the above-described configuration in FIG. 4 are designated by the same reference signs, and their explanations will be omitted hereunder where appropriate. That is, the television receiver 10 in FIG. 5 has a configuration common to that in FIG. 4, whereas the audio equipment 20 in FIG. 5 is devoid of the decoder 251, the splitting section 252, and the sound output section 254, and is newly provided with an arithmetic section 271 compared to the configuration in FIG. 4.

The arithmetic section 271 is configured with an integrated circuit such as LSI or with a dedicated processor. The arithmetic section 271 performs processes such as decoding and signal processing on the audio signal input thereto from the television receiver 10 via the transmission cable 31.

The signal processing on the audio signal involves extracting high-range and mid-low-range components from the center signal included in the audio signal. As a result of the signal processing, a high-range component signal is output to the television receiver 10 via the center-speaker cable 32 and a mid-low-range component signal is supplied to the sound output section 253.

Note that, when the arithmetic section 152 of the television receiver 10 gives notification of the speaker-related parameters of the television receiver 10 (e.g., information regarding frequency characteristics) to the audio equipment 20 via the transmission cable 31, the arithmetic section 271 can adjust the frequency characteristics of the center signal based on the information regarding the frequency characteristics, for example.

The arithmetic section 153 of the television receiver 10 supplies the sound output section 155 with the high-range component signal input from the audio equipment 20 via the center-speaker cable 32. The sound output section 155 reproduces and outputs the sound (high-range center sound) corresponding to the high-range component signal supplied from the arithmetic section 153. On the other hand, the sound output section 253 of the audio equipment 20 reproduces and outputs the sound (mid-low-range center sound) corresponding to the mid-low-range component signal fed from the arithmetic section 271.

Figure 6:
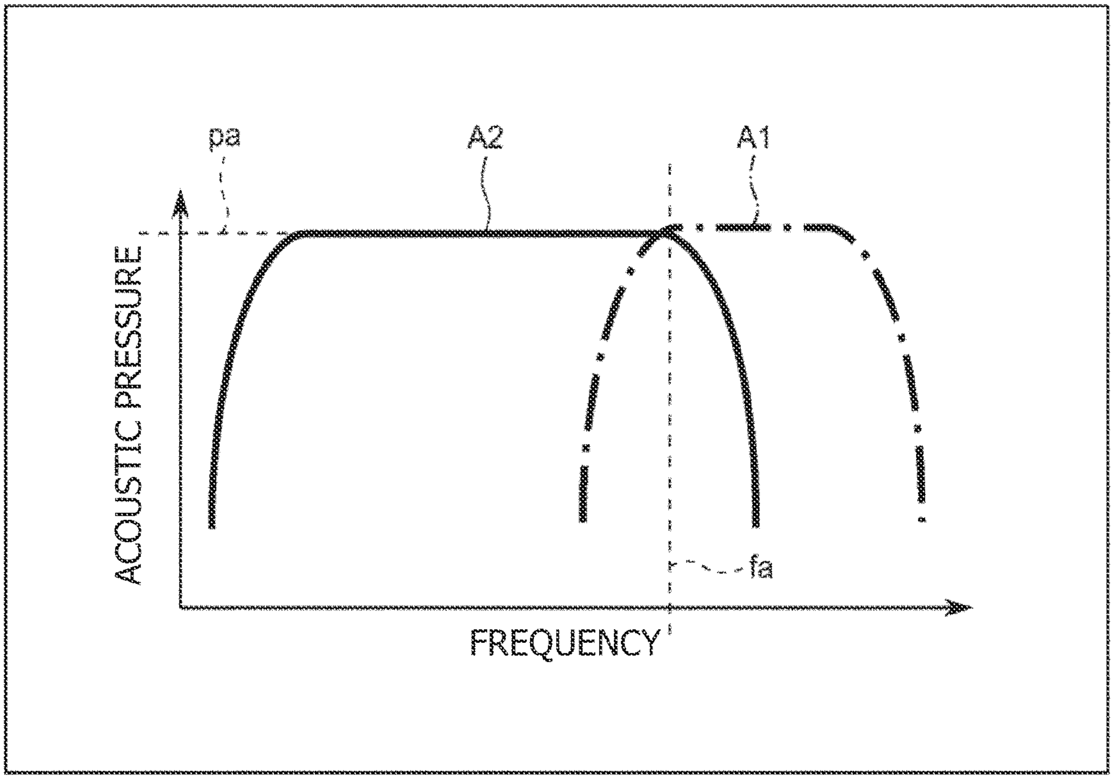
FIG. 6 is a view depicting relations between a frequency and acoustic pressure of a high-range component as well as between the frequency and the acoustic pressure of a mid-low-range component.

FIG. 6 is a view depicting relations between the frequency and the acoustic pressure of the high-range component as well as between the frequency and the acoustic pressure of the mid-low-range component. In FIG. 6 where the horizontal axis stands for frequency (Hz) and the vertical axis for acoustic pressure (dB), a waveform A1 denotes the relations between the frequency and the acoustic pressure of the high-range component, and a waveform A2 represents the relations between the frequency and the acoustic pressure of the mid-low-range component.

In FIG. 6, the frequencies higher than a frequency "fa" and represented by the waveform A1 are the high-range component, and the frequencies lower than the frequency "fa" and indicated by the waveform A2 are the mid-low-range component. In this manner, the reproduction band is split into a high-range component signal and a mid-low-range component signal, the high-range component signal being reproduced from the sound output section 155 of the television receiver 10, the mid-low-range component signal being reproduced from the sound output section 253 of the audio equipment 20.

The television receiver 10 and the audio equipment 20 configured as discussed above align the speaker-reproduced sounds, simultaneously reproducing the sound corresponding to the center signal (high-range center sound and mid-low-range center sound). In this manner, images and reproduced sounds are synchronized in position, which localizes the sound image on the screen.

In order to effectively align the speaker-reproduced sounds between the television receiver 10 and the audio equipment 20, the acoustic pressure level of the high-range component represented by the waveform A1 may be aligned with the acoustic pressure level of the mid-low-range component indicated by the waveform A2. In FIG. 6, for example, signal processing is performed in such a manner that the acoustic pressure level of the high-range component and that of the mid-low-range component substantially coincide in acoustic pressure "pa."

Incidentally, what is explained above with reference to FIGS. 5 and 6 is the case in which the reproduction band is split into the high range and the mid-low-range. This range categorization, however, is used only for reasons of expediency. Generally, for example, a band ranging from 20 to 600 Hz is regarded as the low range, a band from 800 to 2,000 Hz as the midrange, and a band from 4,000 to 20,000 Hz as the high range. That is, when a given band is regarded as a first range and a range lower than the first range is regarded as a second range, the high range is included in the first range, and the mid-low-range is included in the second range. Alternatively, the range categorization may involve dividing into two ranges: high range and low range. In the above case, the high range is the first range and the low range is the second range.

Third Example

Figure 7:
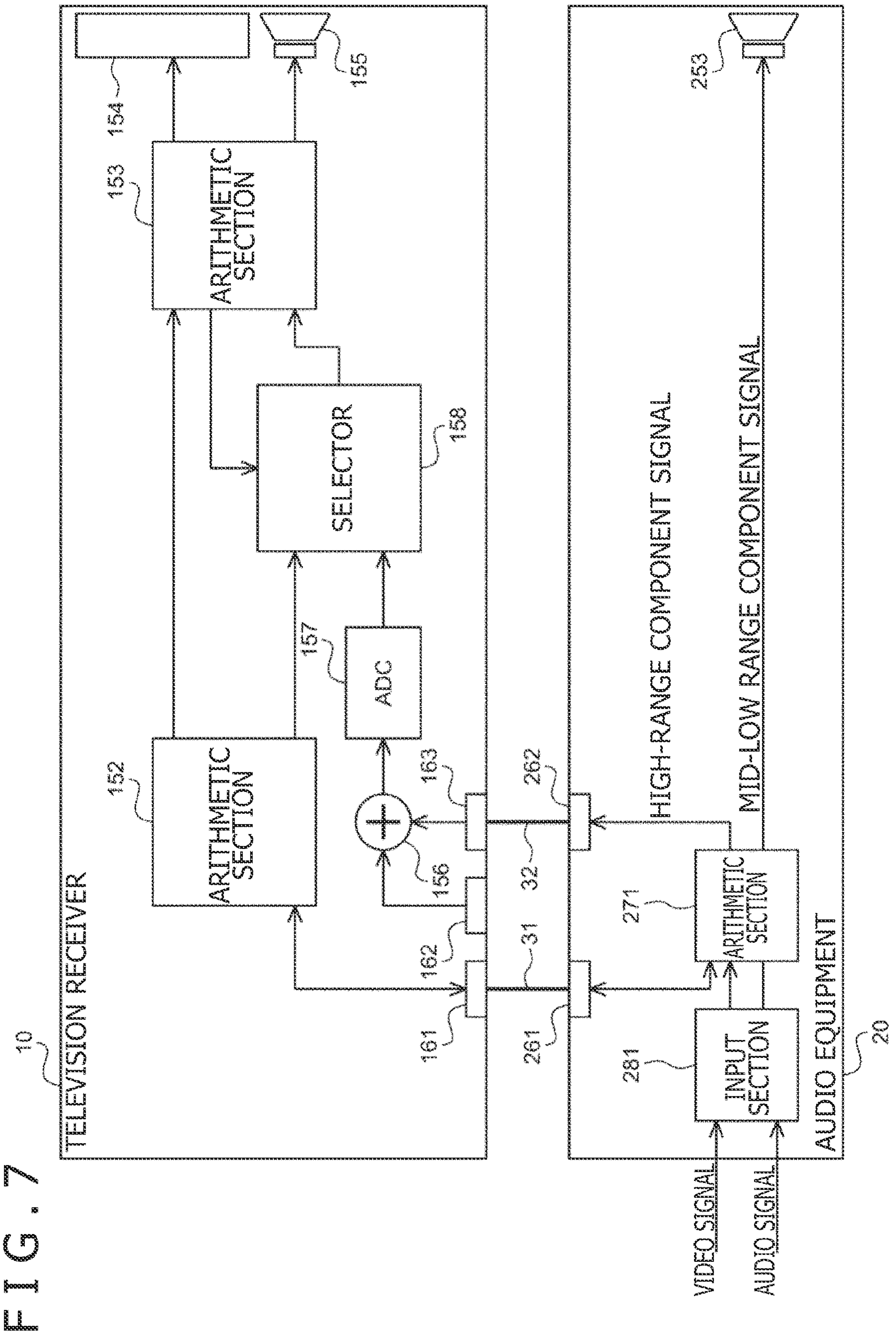
FIG. 7 is a block diagram depicting a third example of the configuration of the reproduction system to which the present disclosure is applied.

FIG. 7 is a block diagram depicting a third example of the configuration of the reproduction system to which the present disclosure is applied.

In the configuration depicted in FIG. 7, the constituent elements corresponding to those in the above-described configuration in FIG. 5 are designated by the same reference signs, and their explanations will be omitted hereunder where appropriate. That is, the television receiver 10 in FIG. 7 is devoid of the input section 151 whereas the audio equipment 20 in FIG. 7 is newly provided with an input section 281 compared to the configuration in FIG. 5.

In FIG. 7, the audio equipment 20 includes the input section 281, the arithmetic section 271, and the sound output section 253.

The input section 281 is configured as an interface that complies with predetermined protocols such as the HDMI (registered trademark). In a case where the input section 281 is configured as the interface complying with predetermined protocols, the input section 281 supplies the arithmetic section 271 with the signals of content recorded by a video recorder (video player) or by network storage or with the signals of content recorded on recording media such as optical disks or semiconductor memories.

The arithmetic section 271 outputs the video signal fed from the input section 281 to the television receiver 10 via the transmission cable 31. In the television receiver 10, the video signal from the audio equipment 20 is supplied to the arithmetic section 153 that in turn causes the display section 154 to display the images of content.

Also, the arithmetic section 271 performs processes such as decoding and signal processing on the audio signal supplied from the input section 281. The signal processing on the audio signal involves carrying out processes for controlling the frequency characteristics of the center signal as explained above with reference to FIGS. 5 and 6. During the processing, a high-range component signal is output to the television receiver 10 via the center-speaker cable 32 and a mid-low-range component signal is supplied to the sound output section 253.

In the television receiver 10, the high-range component signal from the audio equipment 20 is supplied to the arithmetic section 153 that in turn causes the sound output section 155 to reproduce the sound corresponding to the high-range component signal (high-range center sound). In the audio equipment 20, on the other hand, the sound output section 253 reproduces the sound corresponding to the mid-low-range component signal (mid-low-range center sound).

The television receiver 10 and the audio equipment 20 configured as discussed above align the speaker-reproduced sounds, simultaneously reproducing the sound corresponding to the center signal (high-range center sound and mid-low-range center sound). In this manner, images and reproduced sounds are synchronized in position, which localizes the sound image on the screen.

Fourth Example

Figure 8:
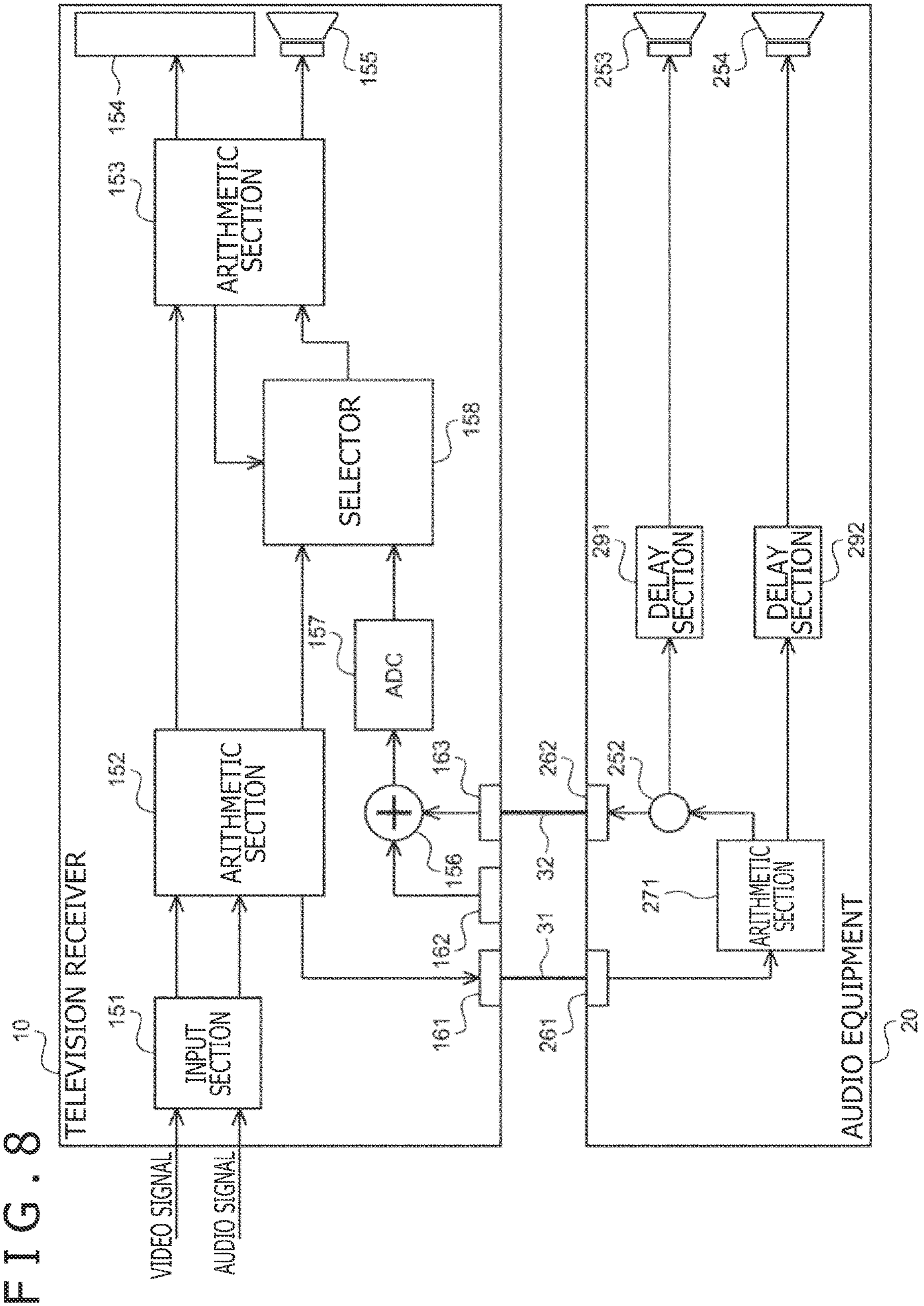
FIG. 8 is a block diagram depicting a fourth example of the configuration of the reproduction system to which the present disclosure is applied.

FIG. 8 is a block diagram depicting a fourth example of the configuration of the reproduction system to which the present disclosure is applied.

In the configuration depicted in FIG. 8, the constituent elements corresponding to those in the above-described configuration in FIG. 4 are designated by the same reference signs, and their explanations will be omitted hereunder where appropriate. That is, the television receiver 10 in FIG. 8 has a configuration common to that in FIG. 4, whereas the audio equipment 20 in FIG. 8 has the arithmetic section 271 replacing the decoder 251 and is newly provided with delay sections 291 and 292.

In FIG. 8, the audio equipment 20 includes the arithmetic section 271, the splitting section 252, the delay sections 291 and 292, and the sound output sections 253 and 254.

The arithmetic section 271 decodes the audio signal of content input thereto from the television receiver 10 via the transmission cable 31 and, following the decoding, supplies the center signal to the splitting section 252 and feeds the other-channel signal to the delay section 292. By splitting the center signal fed from the arithmetic section 271, the splitting section 252 supplies the center signal to the delay section 291 as well as to the television receiver 10 via the center-speaker cable 32.

The information regarding the delay time of the center signal (referred to as the delay time information hereunder) is input to the audio equipment 20 from the arithmetic section 152 of the television receiver 10 via the transmission cable 31.

On the basis of the delay time information from the television receiver 10, the delay section 291 delays the center signal coming from the splitting section 252 and supplies the delayed center signal to the sound output section 253. On the basis of the delay time information from the television receiver 10, the delay section 292 delays the other-channel signal supplied from the arithmetic section 271 and supplies the delayed other-channel signal to the sound output section 254.

As described above, the delay sections 291 and 292 delay the center signal and the other-channel signal, respectively, on the basis of the delay time information from the television receiver 10. This enables the television receiver 10 to reproduce the sound (center sound) earlier in time than the sound reproduced by the audio equipment 20 (center sound and other-channel sound).

That is, when the television receiver 10 and the audio equipment 20 align the speaker-reproduced sounds to simultaneously reproduce the sound corresponding to the center signal (center sound), the sound from the television receiver 10 (center sound) is reproduced earlier in time than the sound reproduced from the audio equipment 20 (center sound). Since the sound from the television receiver 10 (center sound) is reproduced with a preceding sound effect, on-screen localization is implemented with high acoustic performance.

The preceding sound effect signifies that the sound image is localized in the direction of the sound reaching the user first. When the sound from the television receiver 10 (center sound) is reproduced earlier in time than the sound reproduced from the audio equipment 20 (center sound), the user's auditory sense is localized on the side of the television receiver 10.

Further, as explained above with reference to FIGS. 5 and 6, the arithmetic section 271 may perform signal processing on the audio signal, outputting the high-range component signal to the television receiver 10 via the center-speaker cable 32 and supplying the mid-low-range component signal to the delay section 291. In this case, the delay section 291 delays the mid-low-range component signal from the arithmetic section 271 based on the delay time information. This causes the sound output section 253 to reproduce and output the sound corresponding to the delayed mid-low-range component signal (mid-low-range center sound).

That is, when the television receiver 10 and the audio equipment 20 align the speaker-reproduced sounds in a manner simultaneously reproducing the sound corresponding to the center signal (center sound), the sound from the television receiver 10 is reproduced (high-range center sound) earlier in time than the sound reproduced from the audio equipment 20 (mid-low-range center sound). This allows the sound from the television receiver 10 to be reproduced (high-range center sound) with the preceding sound effect, which implements on-screen localization with high acoustic performance.

Examples of Speaker Arrangement

Figure 9:
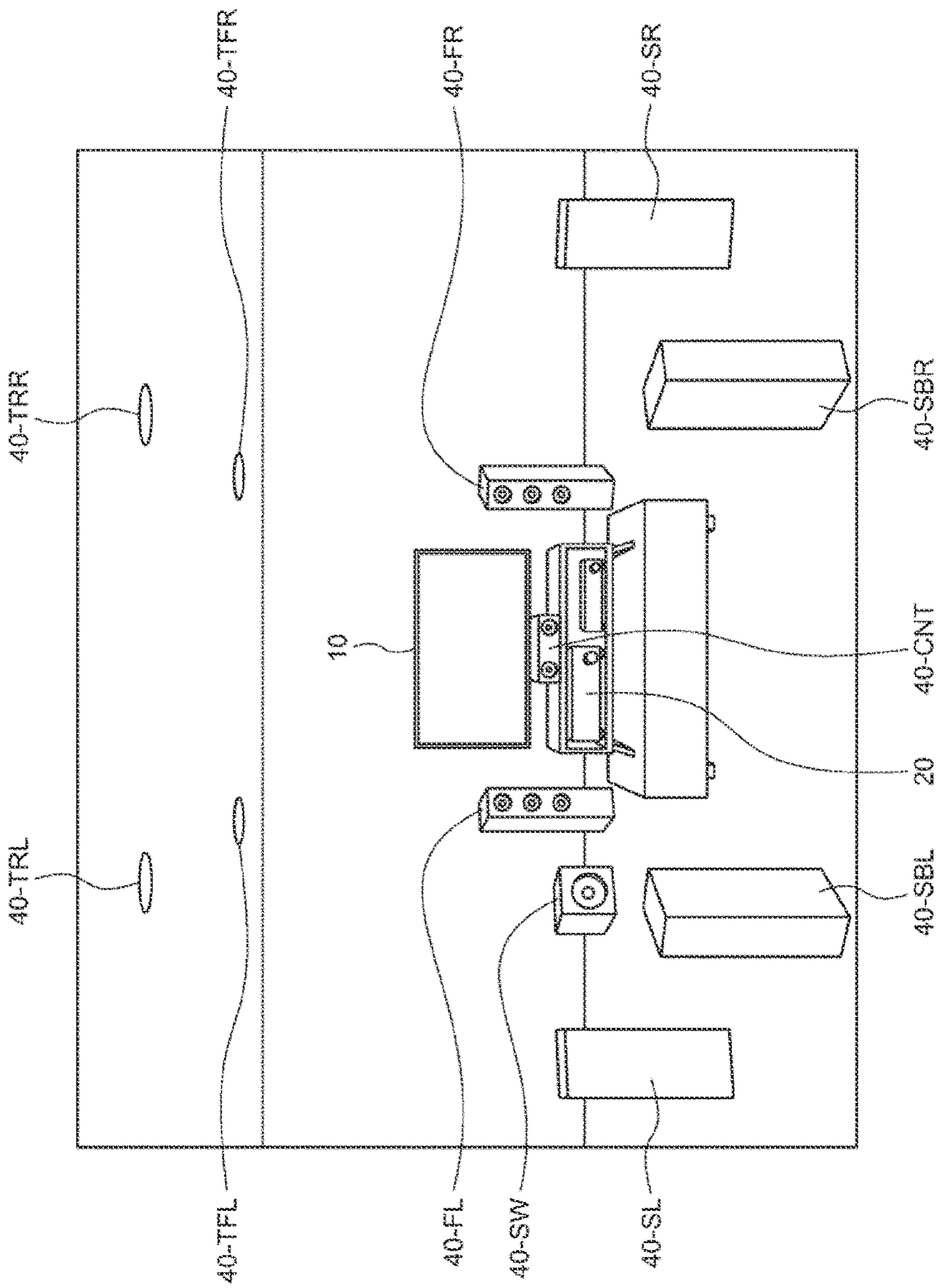
FIG. 9 is a view depicting a first example of arrangement of constituent devices forming the reproduction system to which the present disclosure is applied.
Figure 10:
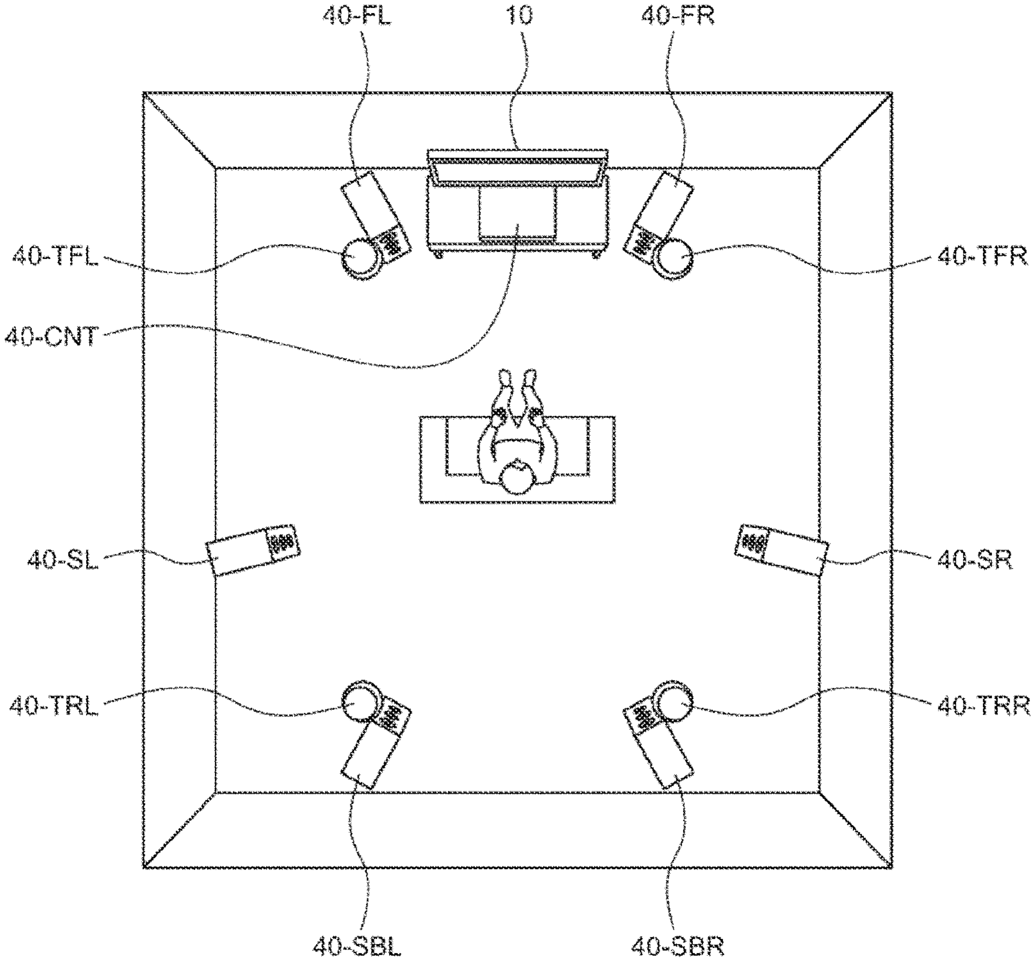
FIG. 10 is another view depicting the first example of the arrangement of constituent devices forming the reproduction system to which the present disclosure is applied.

FIGS. 9 and 10 are views depicting a first example of the arrangement of constituent devices forming the reproduction system to which the present disclosure is applied. Here, of the devices configuring the reproduction system set up in a room, the television receiver 10 is given attention and depicted in a front view in FIG. 9 and in a top view in FIG. 10.

In FIG. 9, the reproduction system to which this disclosure is applied is configured as an AV system using multiple separate-type speakers 40 along with the television receiver 10 and the audio equipment 20. In this AV system, a center-channel speaker is arranged near the television receiver 10 and multichannel speakers are arranged around the user.

That is, in the arrangement of FIG. 9, a 7.1 channel speaker system is formed by front speakers 40-FL and 40-FR, a center speaker 40-CNT, surround speakers 40-SL and 40-SR, surround back speakers 40-SBL and 40-SBR, and a subwoofer 40-SW combined with top front speakers 40-TFL and 40-TFR and top rear speakers 40-TRL and 40-TRR.

In FIG. 9, the television receiver 10 and the audio equipment 20 operate in coordination with each other to simultaneously reproduce both the sound corresponding to the center signal reproduced by the television receiver 10 (center sound) and the sound corresponding to the center signal reproduced by the center speaker 40-CNT (center sound). This synchronizes the images and reproduced sounds in position, thereby localizing the sound image on the screen.

Second Example

Figure 11:
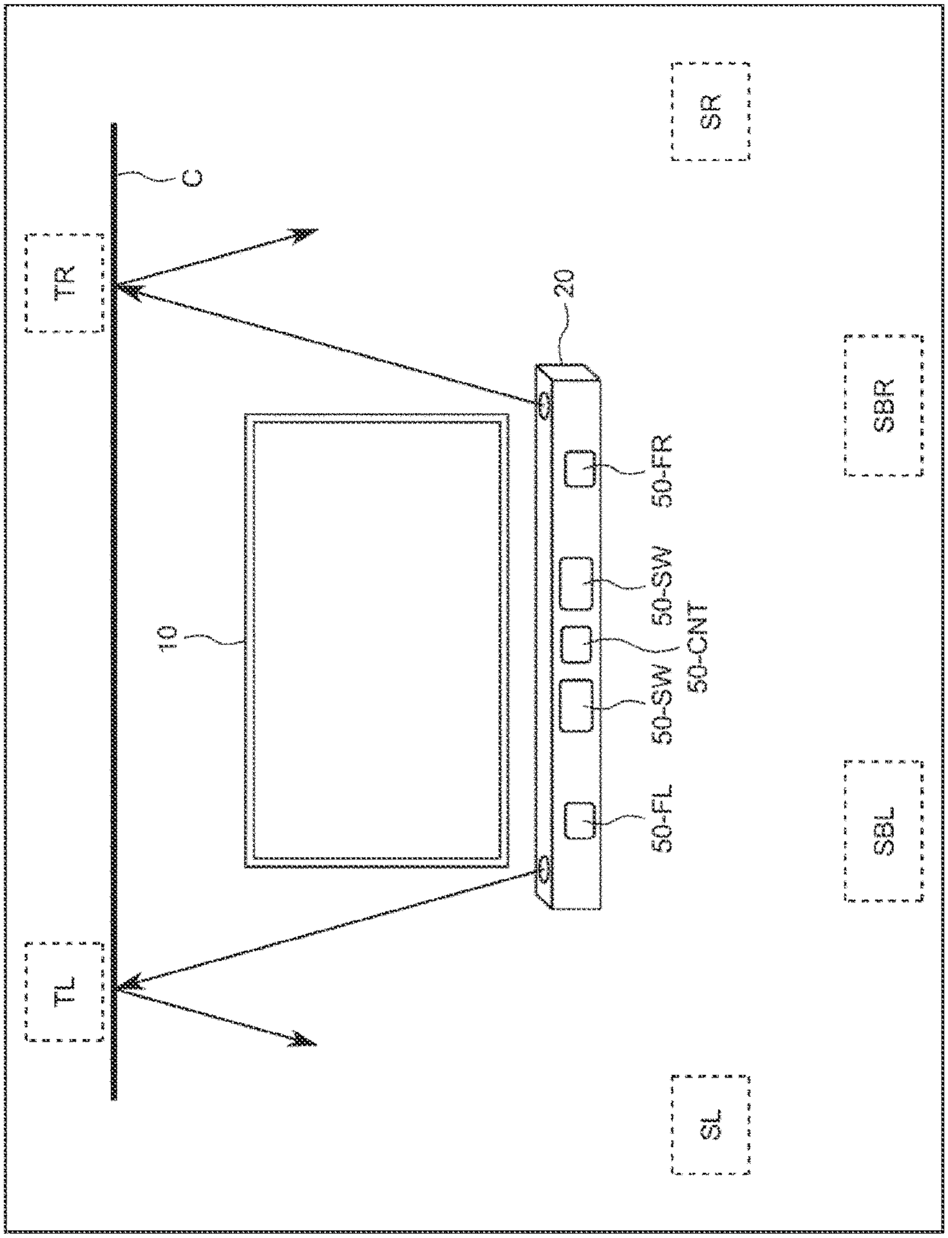
FIG. 11 is a view depicting a second example of the arrangement of constituent devices forming the reproduction system to which the present disclosure is applied.

FIG. 11 is a view depicting a second example of the arrangement of constituent devices forming the reproduction system to which the present disclosure is applied.

In FIG. 11, the reproduction system to which this disclosure is applied is configured as an AV system formed by the television receiver 10 and by the audio equipment 20 acting as a sound bar. The audio equipment 20 has a bar-like housing that accommodates multichannel speakers and an AV amplifier.

The audio equipment 20 incorporates front speakers 50-FL and 50-FR, a center speaker 50-CNT, and a subwoofer 50-SW. Also, the audio equipment 20 causes the reproduced sounds output from the incorporated speakers to reflect on a ceiling C using virtual surround technology, thereby virtually realizing the reproduced sounds from the top speakers (TL, TR), surround speakers (SL, SR), and surround back speakers (SBL, SBR).

In FIG. 11, the television receiver 10 and the audio equipment 20 operate in coordination with each other to simultaneously reproduce both the sound corresponding to the center signal reproduced by the television receiver 10 (center sound) and the sound corresponding to the center signal reproduced by the center speaker 50-CNT (center sound). This synchronizes the images and reproduced sounds in position, thereby localizing the sound image on the screen.

Third Example

Figure 12:
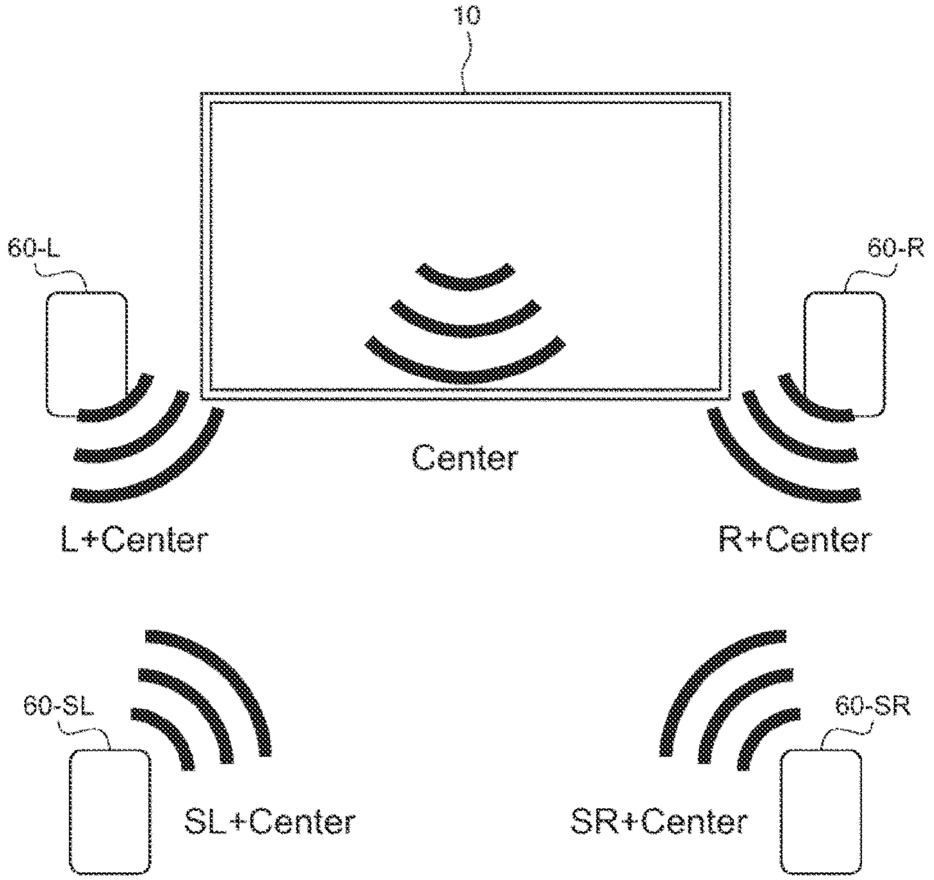
FIG. 12 is a view depicting a third example of the arrangement of constituent devices forming the reproduction system to which the present disclosure is applied.

FIG. 12 is a view depicting a third example of the arrangement of constituent devices forming the reproduction system to which the present disclosure is applied.

In FIG. 12, the reproduction system to which this disclosure is applied is configured as an AV system formed by the television receiver 10 and multiple speakers 60. In FIG. 12, front speakers 60-L and 60-R and surround speakers 60-SL and 60-RL are arranged. Although this AV system has no center speaker, the center sound is reproduced by synthesizing the sounds (sound waves) output from the front speakers 60-L and 60-R and the surround speakers 60-SL and 60-RL. This provides a configuration equivalent to one that includes the center speaker.

The technology used here involves synthesizing the sound waves from multiple real speakers in a manner reproducing a sound source at a desired position. It is thus possible to reproduce, at the desired position, the sound corresponding to the center signal that would be reproduced by the center speaker (center sound). This applicant has proposed this type of technology named Monopole Synthesis disclosed, among others, in the literature cited below. This technology can also be applied to the configuration depicted in FIG. 12.

Literature: U.S. Pat. No. 9,749,769

Note that, although FIG. 12 indicates an example in which the sound waves from four speakers 40 are synthesized, the number of real speakers needs only be 3 or more. As many real speakers as possible should preferably be configured in order to reproduce the sound source.

Note that, in FIG. 12, the sound corresponding to the center signal from the television receiver 10 (center sound) is reproduced simultaneously with the center sound reproduced by synthesizing the sounds (sound waves) output from the front speakers 60-L and 60-R and the surround speakers 60-SL and 60-RL. This synchronizes the images and reproduced sounds in position, thereby localizing the sound image on the screen.

2. Modifications (Monitoring of Cable Connection State)

As explained above with reference to FIGS. 4 and 5 and elsewhere, the television receiver 10 and the audio equipment 20 are interconnected via the center-speaker cable 32 for center signal transmission therebetween. Since the center-speaker cable 32 is to be attached by the user who has purchased the equipment, there may be a case where the cable connection is not correct. In view of such eventuality, the AV system 1 can monitor the connection state of the center-speaker cable 32 and give a notification corresponding to the monitored result.

Figure 13:
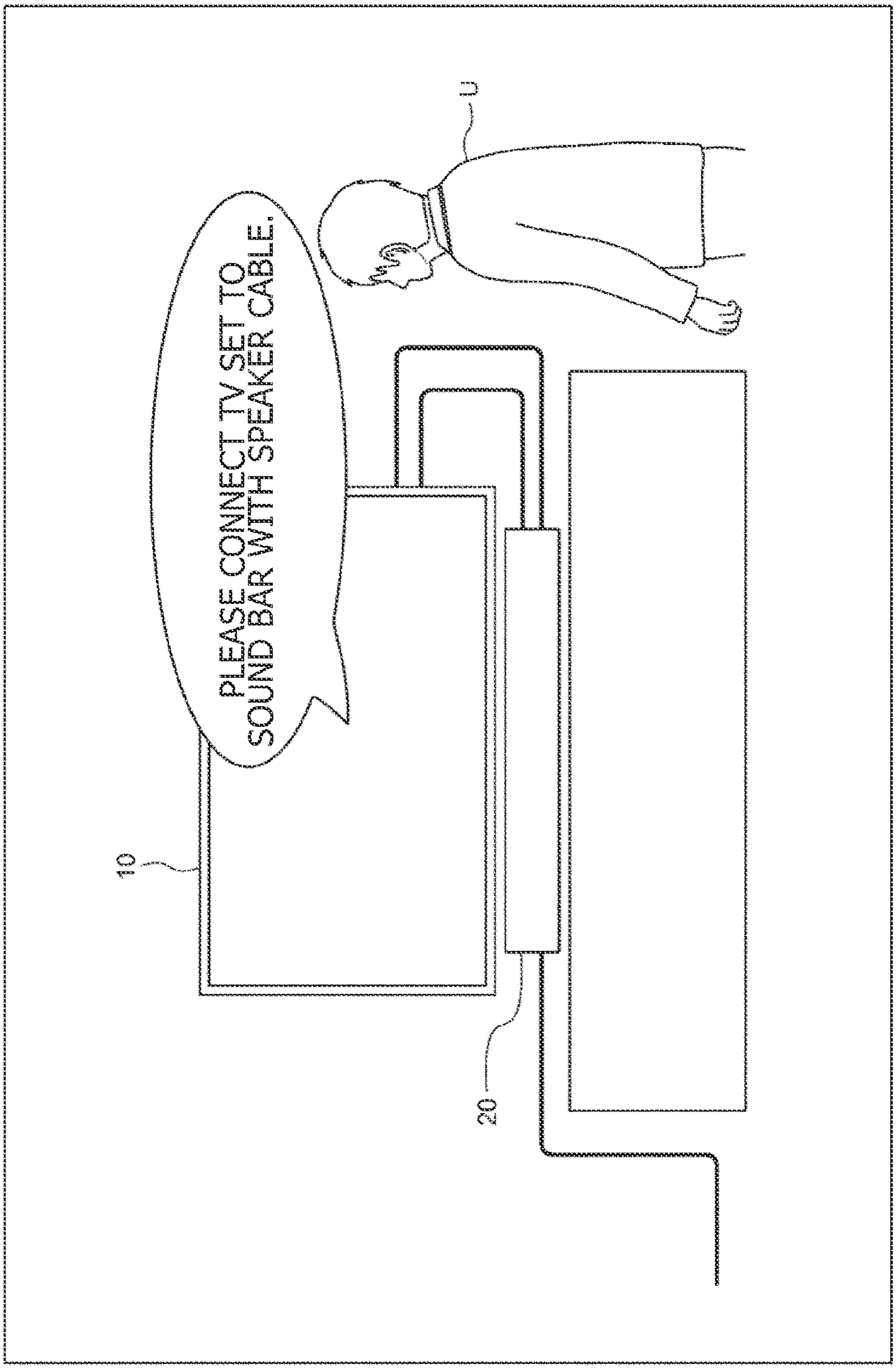
FIG. 13 is a view depicting an example of a notification corresponding to a state of cable connection.

FIG. 13 is a view depicting an example of a notification corresponding to the state of connection of the center-speaker cable 32.

In FIG. 13, the arithmetic section 271 or other relevant section in the audio equipment 20 monitors the state of the terminal 262. The arithmetic section 271 gives a notification of connection state information indicative of the connection state of the center-speaker cable 32 to the television receiver 10 via the transmission cable 31 at a predetermined timing.

The arithmetic section 152 or other relevant section in the television receiver 10 performs various processes corresponding to the connection state of the center-speaker cable 32 based on the connection state information sent from the audio equipment 20 via the transmission cable 31.

For example, in a case where the settings regarding the on-screen localization reflecting the user's operations are made on the television receiver 10 and where the center-speaker cable 32 is not correctly connected, the television receiver 10 notifies the user of a message prompting the user to properly reconnect the center-speaker cable 32 as depicted in FIG. 13. The message may be either given audibly by the sound output section 155 or displayed by the display section 154 by using a text or an image, for example.

In a case where the settings regarding the on-screen localization are made on the television receiver 10 and where the center-speaker cable 32 is correctly connected, the settings regarding the on-screen localization remain effective.

As described above, in a case where the settings regarding the on-screen localization are made, with the center-speaker cable 32 not yet connected in the AV system 1, a predetermined message is given to prompt the user to connect the center-speaker cable 32. This allows the user to reconnect the cable securely. On the other hand, where the settings regarding the on-screen localization are made with the center-speaker cable 32 correctly connected, the settings remain effective without the prompt for reconnection. This makes it possible to complete the settings quickly.

Other Configuration Examples

The AV system 1 is explained above as an example of the reproduction system to which the present disclosure is applied. The AV system 1 is configured with the television receiver 10 and the audio equipment 20. The television receiver 10 is an example of the display apparatus to which this disclosure is applied, and the audio equipment 20 is an example of the reproduction apparatus to which the present disclosure is applied.

As explained above with reference to FIGS. 9 and 10, the audio equipment 20 may be configured as an AV amplifier and speakers. In a case of this configuration, the AV amplifier (including the decoder 251 and the splitting section 252) is connected to the television receiver 10 via the transmission cable 31 and the center-speaker cable 32. The AV amplifier and the multiple speakers (including the sound output section 253 or 254) are interconnected by wired or wireless communication.

Also, as explained above with reference to FIG. 11, the audio equipment 20 may be configured as a sound bar. In a case of this configuration, the sound bar (including the decoder 251, the splitting section 252, and the sound output sections 253 and 254) is connected to the television receiver 10 via the transmission cable 31 and the center-speaker cable 32.

(Configuration of Computer)

Figure 14:
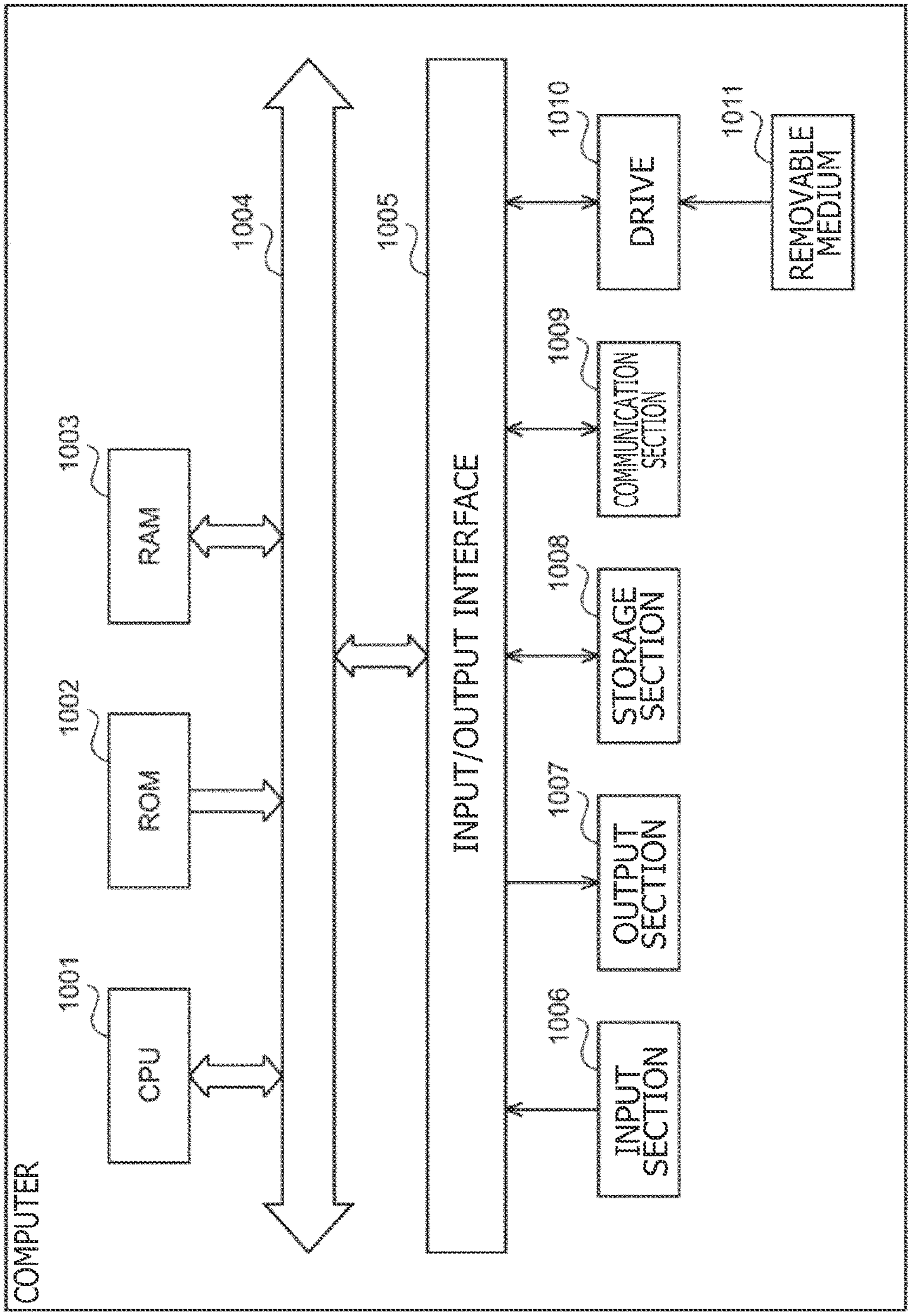
FIG. 14 is a block diagram depicting an example of the configuration of a computer.

The series of the processes described above (e.g., signal processing by the audio equipment 20) may be executed either by hardware or by software. Where the series of the processing is to be carried out by software, the programs constituting the software are installed into a computer of each apparatus. FIG. 14 is a block diagram depicting an example of the configuration of such a computer.

In the computer in FIG. 14, a CPU (Central Processing Unit) 1001, a ROM (Read Only Memory) 1002, and a RAM (Random Access Memory) 1003 are interconnected via a bus 1004. The bus 1004 is further connected with an input/output interface 1005. The input/output interface 1005 is connected with an input section 1006, an output section 1007, a storage section 1008, a communication section 1009, and a drive 1010.

The input section 1006 may be configured with a microphone and various sensors. The output section 1007 may be configured with speakers and a display unit. The storage section 1008 may be configured with a nonvolatile memory and a hard disk. The communication section 1009 may be configured with a network interface. The drive 1010 drives a removable medium 1011 such as a magnetic disk, an optical disk, a magneto-optical disk, or a semiconductor memory.

In the computer configured as described above, the CPU 1001 performs the above-mentioned series of processing by loading appropriate programs from the ROM 1002 or from the storage section 1008 into the RAM 1003 and by executing the loaded programs.

The programs to be executed by the computer (CPU 1001) may be recorded, for example, on the removable medium 1011 as packaged media when offered. The programs may also be offered via a wired or wireless transmission medium such as local area networks, the Internet, and digital satellite broadcasting.

In the computer, the programs may be installed into the storage section 1008 from the removable medium 1011 attached to the drive 1010 via the input/output interface 1005. The programs may also be installed into the storage section 1008 after being received by the communication section 1009 via a wired or wireless transmission medium. The programs may alternatively be preinstalled in the ROM 1002 or in the storage section 1008.

In this specification, the processes performed by the computer according to the programs may include those that are conducted parallelly or individually (e.g., parallel processes or object-oriented processes). Further, the programs may be processed by a single computer (processor) or by multiple computers on a shared basis.

It should be understood that the present disclosure when embodied is not limited to the above-described embodiment and that various modifications, variations and alternatives may be made of this disclosure so far as they are within the scope of the disclosure. The advantageous effects stated in this description are only examples and not limitative of the present disclosure that may provide other advantages as well.

The present disclosure may be implemented preferably in the following configurations.

(1)

A reproduction system including:
- a display apparatus including
  - a display section configured to display an image of content, and
  - a first sound output section configured to output a sound of the content in a manner localizing a sound image on a screen of the display section; and
- a reproduction apparatus including
  - a processing section configured to process an audio signal of the content, and
  - a second sound output section configured to output the sound of the content, in which
- the first sound output section and the second sound output section output the sound simultaneously on the basis of an audio signal of a center channel of the content.

(2)

A display apparatus including:
- a display section configured to display an image of content; and
- a first sound output section configured to output a sound of the content in a manner localizing a sound image on a screen of the display section, in which,
- on the basis of an audio signal of a center channel of the content, the first sound output section outputs the sound corresponding to the audio signal of the center channel of the content simultaneously with a second sound output section included in a reproduction apparatus.

(3)

The display apparatus according to (2) above, in which
- the first sound output section outputs the sound of a first range included in the sound of the content, and
- the second sound output section outputs the sound of a second range lower than the first range.

(4)

The display apparatus according to (3) above, in which
- the first range includes a high range, and
- the second range includes a midrange and a low range.

(5)

The display apparatus according to (3) or (4) above, in which
- the first sound output section outputs the sound of the first range earlier in time than the sound of the second range output from the second sound output section.

(6)

The display apparatus according to any one of (3) to (5) above, in which
- the first range and the second range substantially coincide in acoustic pressure level.

(7)

The display apparatus according to any one of (2) to (6) above, further including:
- an input section configured to input a video signal and an audio signal of the content; and
- a processing section configured to process the video signal and the audio signal of the content, in which
- the processing section outputs the audio signal of the content to the reproduction apparatus, and
- the first sound output section outputs the sound of the content on the basis of the audio signal of the center channel input from the reproduction apparatus.

(8)

The display apparatus according to any one of (2) to (7) above, in which
- the display section includes a liquid crystal display section, and
- the first sound output section includes an actuator that oscillates a bezel portion around a screen of the liquid crystal display section.

(9)

The display apparatus according to any one of (2) to (7) above, in which
- the display section includes an organic EL display section, and
- the first sound output section includes an actuator that oscillates a screen of the organic EL display section.

(10)

The display apparatus according to any one of (2) to (9) above, in which
- the display apparatus is configured as a television receiver set up near the reproduction apparatus.

(11)

A reproduction apparatus including:
- a processing section configured to process an audio signal of content; and
- a second sound output section configured to output a sound on the basis of the audio signal of the content, in which,
- on the basis of an audio signal of a center channel of the content, the second sound output section outputs the sound corresponding to the audio signal of the center channel simultaneously with a first sound output section that outputs the sound of the content in a manner localizing a sound image on a screen of a display section included in a display apparatus.

(12)

The reproduction apparatus according to (11) above, in which,
- on the basis of the audio signal of the center channel, the processing section extracts a first range and a second range included in the sound of the content, the second range being lower than the first range,
- the first sound output section outputs the sound of the first range, and
- the second sound output section outputs the sound of the second range.

(13)

The reproduction apparatus according to (12) above, in which
- the first range includes a high range, and
- the second range includes a midrange and a low range.

(14)

The reproduction apparatus according to (12) or (13) above, in which,
- on the basis of information regarding frequency characteristics input from the display apparatus, the processing section adjusts the frequency characteristics of the audio signal of the center channel.

(15)

The reproduction apparatus according to any one of (12) to (14) above, further including:

a delay section configured to delay the audio signal corresponding to the second range in such a manner that the sound of the first range output from the first sound output section is output earlier in time than the sound of the second range output from the second sound output section.

(16)

The reproduction apparatus according to (15) above, in which the delay section delays the audio signal corresponding to the second range on the basis of information regarding delay time for the audio signal of the center channel input from the display apparatus.

(17)

The reproduction apparatus according to any one of (12) to (16) above, in which the processing section performs adjustment such that the first range and the second range substantially coincide in acoustic pressure level.

(18)

The reproduction apparatus according to any one of (11) to (17) above, in which the processing section processes the audio signal of the content input from the display apparatus, and supplies the audio signal of the center channel obtained from the audio signal of the content to the second sound output section while also outputting the audio signal of the center channel to the display apparatus.

(19)

The reproduction apparatus according to any one of (11) to (17) above, further including:

an input section configured to input a video signal and the audio signal of the content, in which the processing section outputs the video signal of the content to the display apparatus, and supplies the audio signal of the center channel obtained from the audio signal of the content to the second sound output section while also outputting the audio signal of the center channel to the display apparatus.

(20)

The reproduction apparatus according to any one of (11) to (19) above, in which the reproduction apparatus is configured as audio equipment set up near the display apparatus.

REFERENCE SIGNS LIST

1: AV system
10: Television receiver
20: Audio equipment
31: Transmission cable
32: Center-speaker cable
111, 112: Actuator
113, 114: Speaker
131, 132: Actuator
133, 134: Speaker
151: Input section
152: Arithmetic section
153: Arithmetic section
154: Display section
155: Sound output section
156: Synthesis section
157: AD converter
158: Selector
251: Decoder
252: Splitting section
253: Sound output section
254: Sound output section
271: Arithmetic section
281: Input section
291: Delay section
292: Delay section
1001: CPU

What is claimed is:

1. A reproduction system, comprising:

a display apparatus including:

a display section including a screen and configured to display an image of content; and a first sound output section configured to output a sound of the content; and a reproduction apparatus including:

a processing section configured to decode an audio signal of the content including a center-channel signal;

a splitting section configured to split the decoded center-channel signal and output the center-channel signal to both the display apparatus and the reproduction apparatus; and a second sound output section configured to output the sound of the content, wherein the split center-channel signal output from the splitting section is supplied to both the first sound output section and the second sound output section, and wherein the first sound output section and the second sound output section concurrently reproduce the same split center-channel signal so as to localize a sound image on the screen of the display section.

2. The reproduction system according to claim 1, wherein the first sound output section outputs a first frequency range included in the sound of the content, and the second sound output section outputs a second frequency range included in the sound of the content lower than the first frequency range.

3. A display apparatus, comprising:

a display section including a screen and configured to display an image of content; and a first sound output section configured to output a sound of the content, wherein a center-channel signal of the content is split by a splitting section and supplied to the display apparatus, and wherein the first sound output section is configured to reproduce the supplied center-channel signal concurrently with a second sound output section of a reproduction apparatus that receives the same split center-channel signal, such that a sound image is localized on the screen of the display section.

4. The display apparatus according to claim 3, wherein the first sound output section outputs a first frequency range included in the sound of the content, and the second sound output section outputs a second frequency range included in the sound of the content lower than the first frequency range.

5. The display apparatus according to claim 4, wherein the first frequency range included in the sound of the content includes a high range, and the second frequency range included in the sound of the content includes a midrange and a low range.

6. The display apparatus according to claim 4, wherein the first sound output section outputs the first frequency range included in the sound of the content earlier in time than the second frequency range included in the sound of the content output from the second sound output section.

7. The display apparatus according to claim 4, wherein the first frequency range included in the sound of the content and the second frequency range included in the sound of the content substantially coincide in acoustic pressure level.

8. The display apparatus according to claim 3, further comprising:

an input section configured to input a video signal and an audio signal of the content; and a processing section configured to process the video signal and the audio signal of the content, wherein the processing section outputs the audio signal of the content to the reproduction apparatus.

9. The display apparatus according to claim 3, wherein the display section includes a liquid crystal display section, and the first sound output section includes an actuator that oscillates a bezel portion around a screen of the liquid crystal display section and at least one speaker provided at a bottom portion of the liquid crystal display section, below the actuator.

10. The display apparatus according to claim 3, wherein the display section includes an organic electro luminescence (EL) display section, and the first sound output section includes an actuator that oscillates a screen of the organic EL display section and at least one speaker provided at a bottom portion of the EL display section, below the actuator.

11. The display apparatus according to claim 3, wherein the display apparatus is configured as a television receiver set up near the reproduction apparatus.

12. A reproduction apparatus, comprising:

a processing section configured to decode an audio signal of content including a center-channel signal;

a splitting section configured to split the center-channel signal; and a second sound output section configured to output a sound, wherein the splitting section supplies the split center-channel signal to both the reproduction apparatus and a display apparatus, and wherein the second sound output section is configured to reproduce the split center-channel signal concurrently with a first sound output section of the display apparatus that receives the same split center-channel signal, thereby localizing a sound image on a screen of display apparatus.

13. The reproduction apparatus according to claim 12, wherein the processing section extracts a first frequency range and a second frequency range included in the sound of the content, wherein the second frequency range is lower than the first frequency range, wherein the first sound output section outputs the first frequency range included in the sound of the content, and wherein the second sound output section outputs the second frequency range included in the sound of the content.

14. The reproduction apparatus according to claim 13, wherein the first frequency range included in the sound of the content includes a high range, and the second frequency range included in the sound of the content includes a midrange and a low range.

15. The reproduction apparatus according to claim 13, wherein based on information regarding frequency characteristics input from the display apparatus, the processing section adjusts the frequency characteristics of the audio signal of the center channel.

16. The reproduction apparatus according to claim 13, further comprising: a delay section configured to delay the audio signal corresponding to the second frequency range included in the sound of the content in such a manner that the first frequency range included in the sound of the content output from the first sound output section is output earlier in time than the second frequency range included in the sound of the content output from the second sound output section.

17. The reproduction apparatus according to claim 16, wherein the delay section delays the audio signal corresponding to the second frequency range included in the sound of the content based on information regarding delay time for the audio signal of the center channel signal from the display apparatus.

18. The reproduction apparatus according to claim 13, wherein the processing section performs adjustment such that the first frequency range included in the sound of the content and the second frequency range included in the sound of the content substantially coincide in acoustic pressure level.

19. The reproduction apparatus according to claim 12, further comprising:

an input section configured to input a video signal and the audio signal of the content, wherein the processing section outputs the video signal of the content to the display apparatus.

20. The reproduction apparatus according to claim 12, wherein the reproduction apparatus is configured as audio equipment set up near the display apparatus.

* * * * *